(12) United States Patent
Duvoisin et al.

(10) Patent No.: US 11,608,474 B2
(45) Date of Patent: Mar. 21, 2023

(54) SYSTEM AND METHOD FOR THE SEPARATION OF OIL/WATER EMULSIONS BY ELECTROCOALESCENCE

(71) Applicants: Charles Adriano Duvoisin, Balneario Camboriu (BR); Fabio Eduardo Baggio, Curitba (BR)

(72) Inventors: Charles Adriano Duvoisin, Balneario Camboriu (BR); Fabio Eduardo Baggio, Curitba (BR)

( * ) Notice: Subject to any disclaimer, the term of this patent is extended or adjusted under 35 U.S.C. 154(b) by 0 days.

(21) Appl. No.: 17/790,249

(22) PCT Filed: Dec. 29, 2020

(86) PCT No.: PCT/BR2020/050635
§ 371 (c)(1),
(2) Date: Jun. 30, 2022

(87) PCT Pub. No.: WO2021/134122
PCT Pub. Date: Jul. 8, 2021

(65) Prior Publication Data
US 2023/0041128 A1    Feb. 9, 2023

(30) Foreign Application Priority Data
Dec. 30, 2019    (BR) ..................... 10 2019 028302 5

(51) Int. Cl.
*C10G 33/02*    (2006.01)
*B03C 11/00*    (2006.01)
*B01D 17/06*    (2006.01)

(52) U.S. Cl.
CPC .............. *C10G 33/02* (2013.01); *B01D 17/06* (2013.01); *B03C 11/00* (2013.01); *B03C 2201/02* (2013.01)

(58) Field of Classification Search
CPC .......... C10G 33/02; B03C 11/00; B01D 17/06
See application file for complete search history.

(56) References Cited

U.S. PATENT DOCUMENTS

| | | | |
|---|---|---|---|
| 2,000,018 A | 5/1935 | Heinrich | |
| 2,096,774 A | 10/1937 | Wolfe | |
| 2,849,395 A | 8/1958 | Wintermute | |
| 3,532,614 A | 10/1970 | Shirley | |
| 4,415,426 A | 11/1983 | Hsu et al. | |

(Continued)

FOREIGN PATENT DOCUMENTS

| | | |
|---|---|---|
| BR | 112015025890 A2 | 7/2017 |
| BR | 112014007064 A2 | 9/2019 |

OTHER PUBLICATIONS

Noik, Christine, et al.: "Electrostatic Demulsification on Crude Oil: A State-of-the-Art Review" Paper presented at the International Oil & Gas Conference and Exhibition in China, Beijing, China, Dec. 2006.

(Continued)

*Primary Examiner* — Brian W Cohen
(74) *Attorney, Agent, or Firm* — Eandi Fitzpatrick LLP

(57) ABSTRACT

The present invention relates to a system for the separation of oil/water emulsions by electrocoalescence having a fluid conduction means or tubing, at least one cathode, at least one electrode, at least one anode, at least one power source and at least one spark gap for a cathode and a spark gap for the anode. Furthermore, the present invention also relates to a method for the separation of oil/water emulsions by electrocoalescence carried out by a system according to the invention.

10 Claims, 3 Drawing Sheets

(56) References Cited

U.S. PATENT DOCUMENTS 5,458,757 A  10/1995 MacEdmondson
2017/0021287 A1  1/2017 Mahmoudi

OTHER PUBLICATIONS

S. Mhatre et al.: "Electrostatic phase separation:A review", Chemical Engineering Research and Design, vol. 96, 2015, pp. 177-195.

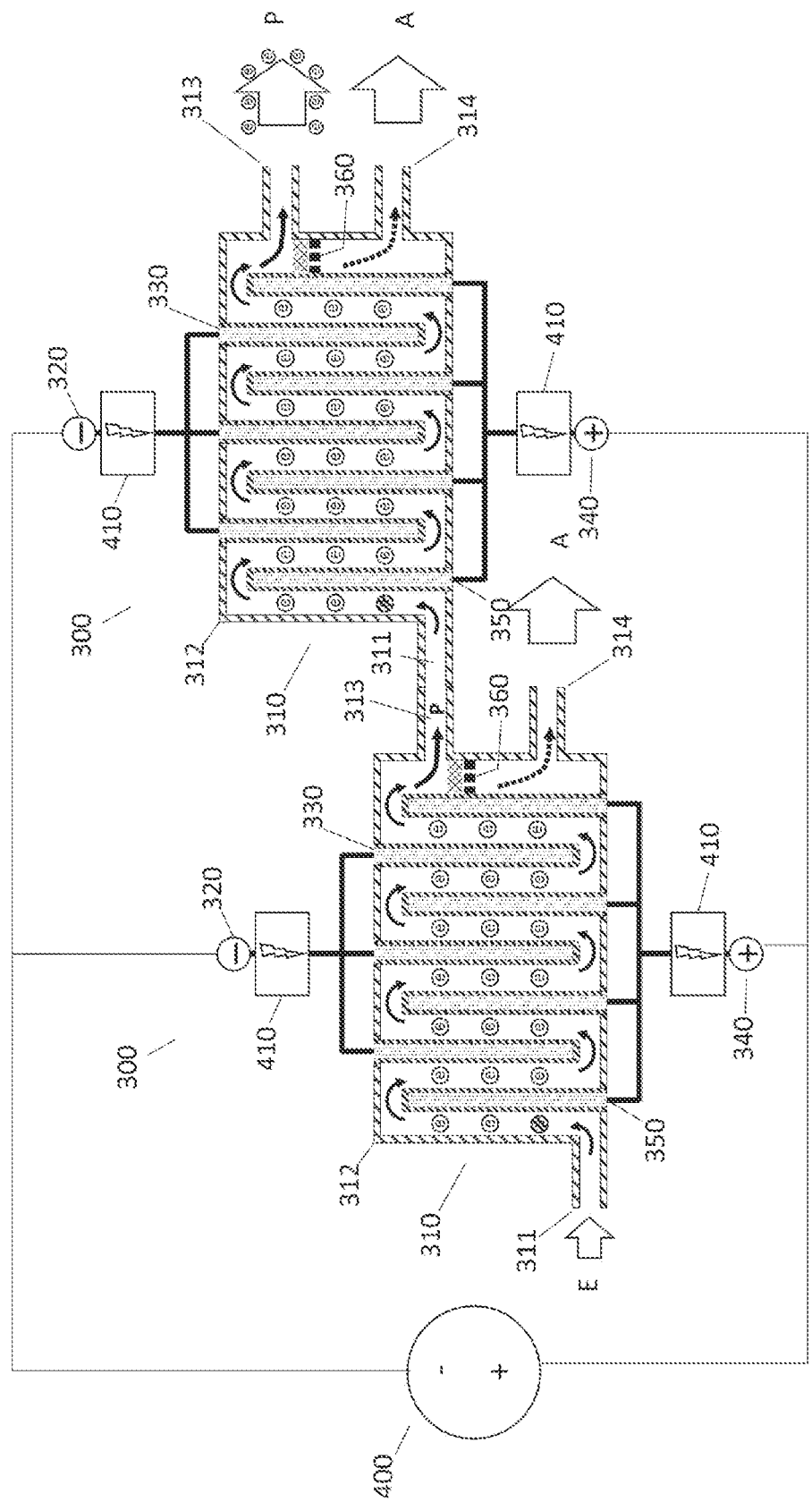

SYSTEM AND METHOD FOR THE SEPARATION OF OIL/WATER EMULSIONS BY ELECTROCOALESCENCE

CROSS-REFERENCE TO RELATED APPLICATIONS

The present utility patent application is a United States National Stage Application filed under 35 U.S.C 371 of Patent Cooperation Treaty Patent Application No. PCT/BR2020/050535 entitled System and Method for the Separation of Oil/Water Emulsions by Electrocoalescene filed Dec. 29, 2020, which itself claims priority benefit to Brazilian Utility Patent Application No. BR 10 2019 028302 5 filed Dec. 30, 2019, the entire contents of each are incorporated by reference herein for all purposes.

TECHNICAL FIELD

The present invention concerns the field of electrocoalescence of oil/water emulsions by using an electron trap. The present invention relates to a system and method for the separation of emulsions composed of oil and water by electrocoalescence, by means of the creation of an electron trap, allowing for the separation of the two compounds of the emulsion in a tubular system or a labyrinth system, isolated or serially.

BACKGROUND

The most commonly used oil treatments range from the use of physical and chemical means to refining, purifying, and removing waste, water and/or hydrocarbons.

Physical filters are known and used, such as classical physical barriers, sieves, gravels, activated carbons, polymers, nanoparticles, cavitations, nanocavitations, centrifuges, electrolysis systems, decanters, ozonators, electromagnetic waves, among others, as well as chemical means, such as of various chemical products, surfactants, and polymers used to flocculate, bind, polarize, and purify the extracted oil.

Note however that the state of the art does not provide solutions using the properties and advantages of electron traps as agents for electrocoalescence of emulsions containing oil and water.

Approximate solutions, however unsatisfactory, can be verified in state-of-the-art documents such as the US patent document US 2017/0021287, entitled "Systems and methods for unipolar separation of emulsions and other mixtures", which relates to systems and methods for separating two or more phases of an emulsion or other mixture, wherein said methods include providing the mixture with a net and unipolar charge (e.g., such that adjacent droplets therein acquire net and unipolar charges), thereby enhancing coalescence of like-phase droplets therein and producing, or enhancing the production of, two or more consolidated phases; and collecting the two or more consolidated phases.

Note, however, that the teachings from US 2017/0021287 do not provide conditions for creating an electron trap. On the contrary, it is grounded (see, for example, its FIG. 18), which allows for the discharge and neutralization of the emulsion and prevents trapping free electrons and products overloaded therewith. Furthermore, teachings regarding its use in an oil field are scarce and superficial, with brief mentions of its applications suiting this technical area. Thus, one skilled in the art cannot find said teachings sufficient as to this specific application.

Another patent document whose solution may be mentioned is document PI 1002195-7, entitled "Process to increase the efficiency of electrocoalescence of water and oil emulsions", which describes a process for increasing the electrocoalescence efficiency of water/oil (A/O) emulsions formed in oil treatment facilities in the desalination and dehydration steps, said process comprising forming a composition including between 0.001% and 50% by weight of vegetable, animal or synthetic triglycerides, petroleum and water between 2% and 40% water, preferably between 5% and 25% water by weight, and subjecting such composition to an electrostatic field under alternating or direct current or both, alternating and direct, inside a vessel, and recovering two liquid phases at the end of the process, one aqueous and the other oily, separating the oily phase with greater yield than in electrocoalescence processes that do not use the composition containing vegetable, animal or synthetic triglycerides, oil and water, according to its abstract. Also according to its abstract, the composition used in said process is described.

However, PI 1002195-7 also does not provide conditions for creating an electron trap. Note also that its figures and specification do not provide details on vessel or voltage application device to one skilled in the art, and thus using devices already known in the state of the art and lack of suggestion or disclosure of a device or a new system with advantages over what was known up to the time of its publication is verifiable. Additionally, and as evidenced by the abstract itself, such document makes use of a composition as a demulsifying agent in order to obtain the expected results. In addition to being more expensive, the inclusion of such a composition makes the electrocoalescence process less optimized.

Finally, it is also worth mentioning the patent document WO2013/082681, entitled "Equipment for the electrostatic destabilization of pressurized fluid emulsions in a sealed system and testing method", which describes an equipment for the electrostatic destabilization of emulsions of conductive and non-conductive fluids under pressure in a sealed system, in which the separation of the emulsion occurs by the electrocoalescence process, with high efficiency and industrially used according to its abstract. The equipment of WO2013/082681 comprises a separation vessel, a feed vessel for feeding the fluids into the vessel and gases to pressurize said vessel, an agitator for emulsifying the fluids, the vessel being kept sealed by threaded connections that fit the top covers of the vase. Furthermore, the testing method to evaluate the electrostatic stability of fluid emulsions with the aid of the equipment is also described in this this document.

In addition to a sophisticated constructive configuration, the object of WO2013/082681 shows a much more complex and diverse test method than the one claimed by the present invention. By way of example only, the method claimed by the WO document above requires agitating the emulsion and thus obviously providing an agitator with the equipment. Noted also that it shows a system of directly applied electrolysis which however differs greatly from the proposed electron trap of the subject matter claimed herein, as a simple electric current through two electrodes does not characterize an electron trap. One skilled in the art will understand that in order to generate an electron trap, it will be necessary to have an electric current blocker in the medium, in addition to a system composed of generators with high electric voltages.

It should also be noted that electroneutralization by simple electrolysis processes is already widely known, and reports of its use can be easily found throughout the literature in this technical area. However, reports on the use of electron traps for such purposes as well as to provide physicochemical effects in a practical way are very scarce and incomplete.

There are several advantages in using electron traps for several diverse applications, among which are the economy of energy consumption (compared to simple electrolysis), ease of adaptation in many practical systems both dynamically and in batches, commercial application simple and economical, high processing speed, in addition to a clean and sustainable process.

As such, considering the teachings from the state of the art, there is a clear demand for an emulsion separation solution that solves the problems not overcome by the relevant state of the art.

Thus, the subject matter disclosed herein aims to solve such problems by means of an emulsion electrocoalescence system and method using the electron trap principle together with spark gaps or trivial electric current flow blockers, thus providing the potential differentials necessary for the due electron traps in question, in which electrical energy is applied to an oil/water emulsion in order to electro-energize the fatty acids and other petroleum radicals, forcing their separation from the water.

SUMMARY OF THE INVENTION

One of the objectives of the present invention is providing an oil/water emulsion electrocoalescence system, wherein the emulsion is passed through the inside of a tubing provided with electrodes forming an electron trap. Said electron trap forces the separation of oil and water.

Another objective of this invention is providing a method to be applied by the aforementioned system, wherein said oil/water emulsion electrocoalescence method is based on introducing an oil/water emulsion into a tubing, subjecting the emulsion to an electron trap and subsequently dispensing separated oil and water.

BRIEF DESCRIPTION OF THE FIGURES

For better understanding and visualization of the subject matter, the present invention will now be described with reference to the appended figures, representing the obtained technical effect through exemplary embodiments without limiting the scope of the present invention, in which:

FIG. 3 shows a variation on the embodiment of the emulsion electrocoalescence system exemplified in FIG. 2.

DETAILED DESCRIPTION OF THE INVENTION

System

Figure 1:
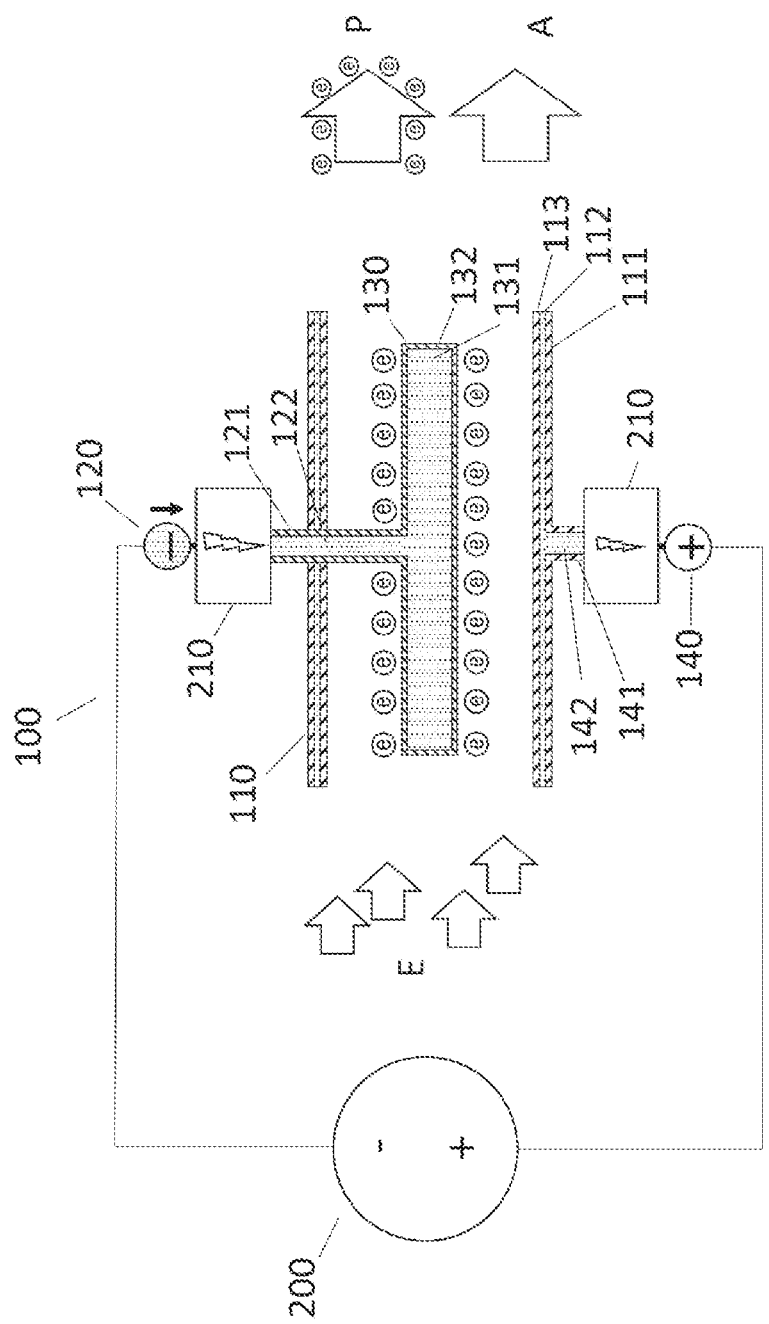
FIG. 1 shows a schematic sectional view of one of the embodiments of the emulsion electrocoalescence system.

An oil/water emulsion electrocoalescence system (100), or just system (100) according to the invention comprises a fluid conduction means or tubing (110), at least one cathode (120), at least one electrode (130), at least one anode (140), at least one power source (200) and at least a spark gap (210) for a cathode (120) and a spark gap (210) for the anode (140).

The tubing (110) of the present system (100) is composed of at least an outer layer (111) of dielectric material, an intermediate layer (112) of electrically conductive material and an inner layer (113) of dielectric material. The outer (111) and inner layers (113) are intended to isolate the intermediate layer (112) of electrically conductive material from contact with the surface, with other electrically conductive materials, or with the oil/water emulsion (E) to be treated by the present system (100).

One skilled in the art will understand that electrically conductive materials and electrical dielectric or insulating materials are widely known in the art, including, but not limited to, copper, stainless steel, graphite, graphene, aluminum and the like in the case of conductors, and PP, PE, polymers, ceromers, glasses and the like in the case of dielectrics.

The cathode (120) of the present system (100) is composed of an inner layer (122) of electrically conductive material and is coated with an outer layer (121) of dielectric material intended to insulate the inner layer (122) from contact with the surface, with other electrically conductive materials, or with the oil/water emulsion (E) to be treated by the present system (100). In the preferred embodiment depicted in FIG. 1, said cathode (120) is connected to at least one electrode (130). The elements described herein can also be solid and coated with appropriate insulating layers, such as polymers, paints, coatings and other forms suitable for insulation under the conditions described and demanded by the invention.

Said at least one electrode (130), similarly to the cathode (120), is composed of an inner layer (132) of electrically conductive material and is coated with an outer layer (131) of dielectric material for proper insulation. The electrode (130) of the present system (100) is arranged inside the tubing (110), electrically isolated therefrom. The elements described herein can also be solid and coated with appropriate insulating layers, such as polymers, paints, coatings and other forms suitable for insulation under the conditions described and demanded by the invention.

The anode (140) of the present system (100) comprises an inner layer (142) of electrically conductive material and is coated with an outer layer (141) of dielectric material intended to insulate the inner layer (142) from contact with the surface or with the oil/water emulsion (E) to be treated by the present system (100). The anode (140) is in electrical contact with the tubing (110).

In a preferred embodiment of the invention, the anode (140) can be connected to the electrode (130), isolated from the tubing (110), while the cathode (120) is connected to the tubing (110).

Finally, the present system (100) also comprises a high voltage power source (200) connected to the at least one cathode (120) and anode (140) for supplying voltage thereto, the cathode (120) and the anode (140) are respectively separated from the electrode (130) and the tubing (110) by means of spark gaps (210) or similar devices capable of acting as a device for transmitting electrical energy by means of sparking (spark gap), i.e., with no electrical contact. As such, undesired grounding or current leakage is avoided for the present invention as grounding is an obstacle to electron trapping. Such spark gaps must exist in order to obtain the necessary conditions for creating the electron trap.

The system (100) of the present invention provides that the tubing (110) has at least two ends, each intended to the inlet of the oil/water emulsion (E) and outlet of energized water (A) and oil (P). Said tubing (110) also has the cathode (120) and the anode (140) affixed thereto, in which the means for connecting the cathode (120) or the anode (140) to the electrode (130) pierce the layers (111, 112, and 113)

of the tubing (110). For this, the outer layer (131) of the electrode (130) prevents the inner layer (132) of the electrode (130) from contact with the intermediate layer (112) of the tubing (110).

It should also be noted that, in order to obtain the necessary conditions for creating an electron trap, a tubing (110) suitable for the object of the present invention needs an inner dielectric layer, such as the discussed inner layer (113), to keep the electrons trapped, with no possibility of grounding or leakage.

One skilled in the art will appreciate that variations on the above teachings will not depart from the scope of the invention. By way of example only, the embodiments and variations exemplified in FIGS. 2 and 3 of the present invention are noted. In them, the oil/water emulsion electrocoalescence system (300) is implemented by means of a tubing (310), a cathode (320), a cathode electrode assembly (330), an anode (330), an anode electrode assembly (350), a dynamic sieve (360) and a power source (400).

In such preferred embodiments, the tubing (310) is arranged in the shape of a radiator or circuit in the form of a labyrinth, having its outer walls composed of an outer layer (312) of dielectric material. There are the cathode (330) and anode electrode assemblies (350) in the gaps formed between the tubing runners (310) arranged in an interspersed manner and electrically separated by means of spark gaps (410). Said cathode (330) and anode electrode assemblies (350) are composed of electrically conductive material. Thus, the oil/water emulsion (E) may be subjected to the electron trap caused by the action of sequentially arranged cathode (330) and anode electrode assemblies (350), with greater control of time and flow of the oil-water emulsion in the inner region of the tubing (310).

Said embodiment of the system (300) also has a dynamic sieve (360) assisting in the separation of oil (P) and water (A) after they have been sequentially subjected to the electron trap inside the tubing (310). The dynamic sieve (360) also acts as a wall, preventing the passage of oil to the end (314). The dynamic sieve exemplified herein may be implemented by an Archimedean screw (spindle or rotating screw) together with a static sieve, but not limited to these two forms of separation.

Finally, it will be appreciated by one skilled in the art that variations such as serially connecting a tubing (310) with another tubing (310), as depicted in FIG. 3, are not outside the scope of the present invention. Furthermore, they also allow the invention to have additional advantages, such as additional oil (P) purification and refining. Thus, the oil (P) that leaves the end (313) of a first tubing (310) of a first system (300) can enter the end (311) of a second tubing (310) of a second system (300) and pass again through the electrocoalescence process disclosed herein.

Method

An oil/water emulsion electrocoalescence method according to the present invention comprises the following method steps:

I. Introducing an oil/water emulsion (E) at one end of a tubing (110);
II. Activating a high voltage power source (200);
III. Emitting sparks at least a cathode (120) and/or an anode (140) by means of spark gaps (210);
IV. Generating an electron trap inside the tubing (110) by means of at least one energized electrode (130);
V. Ionizing the oil/water emulsion (E);
VI. Separating oil (P) and water (A); and
VII. Dispensing oil (P) and water (A) separated at one end of the tubing (110).

Figure 2:
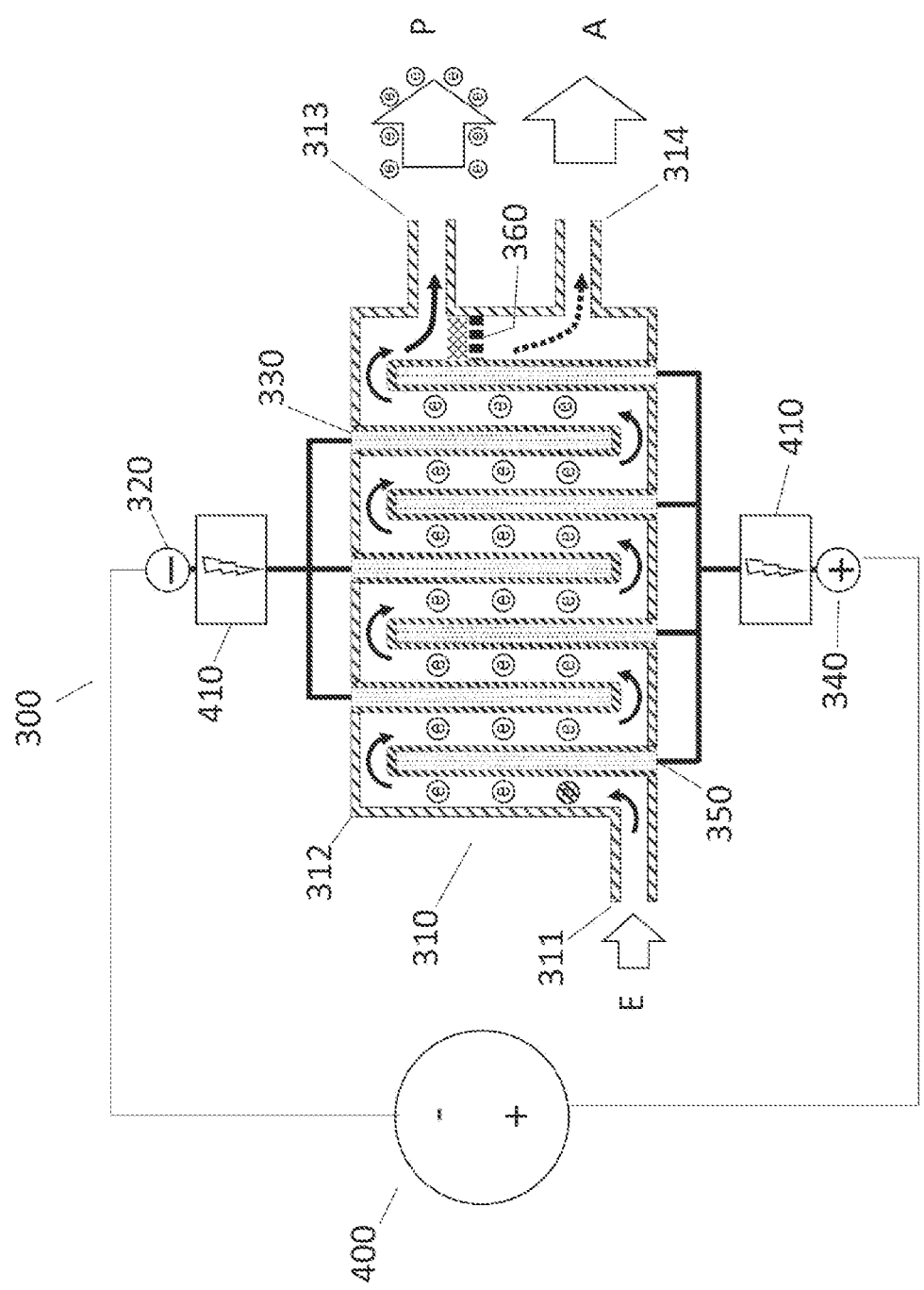
FIG. 2 shows a schematic view of another embodiment of the emulsion electrocoalescence system.

It should be noted that the number of steps in the method does not undergo significant changes with changes in preferred embodiments. For illustrative purposes only, the method steps with reference to the embodiment depicted in FIG. 2 are:

Introducing an oil/water emulsion (E) at one end (311) of a tubing (310);
I. Activating a high voltage power source (400);
III. Emitting sparks at least a cathode (320) and/or an anode (340) by means of spark gaps (410);
IV. Generating an electron trap within the tubing (310) by means of at least one of an energized cathode electrode assembly (330) and/or anode electrode assembly (350);
V. Ionizing the oil/water emulsion (E);
VI. Separating oil (P) and water (A);
VII. Dispensing oil (P) separated from water (A) at one end (313) of the tubing (310);
VIII. Passing water (A) through a dynamic sieve (360); and
IX. Dispensing water (A) separated from oil (P) at one end (314) of the tubing (310).

One skilled in the art will appreciate that the choice of load via the cathode (120, 320) or anode (140, 340) will indicate whether the water (A) of the oil/water emulsion (E) will influence the removal or addition of electrons to the water and consequently in its acidulation or alkalinization. Evidently, also in its surface tension change, in which alkalized water (A) tends to have its surface tension reduced; and acidified water tends to have its surface tension increased.

A positive electrical differential represents a lack of electrons, while a negative electrical differential represents an accumulation of electrons in the water and consequently in its acidulation/positive potential differential/lack of electrons or alkalization/negative electron differential/accumulation of electrons. Such facts occur by directing of electric currents, for example, if a direct negative electric current is directed towards the cathode, then the electron trap will sequester electrons and there will consequently be an accumulation of electrons/negative electrical differential and alkalizing the medium. If a positive direct current is used at the cathodes, then this electron trap will be positive, i.e., with a lack of electrons/positive electrical differential and acidulating the medium. The preferential voltages should be high and with low electric current, either direct or pulsed currents can be used, and alternating currents should also prove interesting, especially for the beginning of this process, as these alternating currents provide intense ionization and thus facilitate the finalized electrocoalescence by direct electric currents at the end of the process.

However, one skilled in the art will note that the present invention provides the use of both acidified and alkalized water (A) within its scope, as in both situations oil (P) and water (A) will exhibit different densities, will separate, and will be separately eliminated by the tubing (110, 310).

Note also that in order to obtain the electron trap, the present invention provides that the power source (200, 400) supplies high voltage, particularly between 10 kV and 10 GV, while the electrical current must be kept low.

Noted that the present invention provides for the use of both direct and alternating current, without prejudice to its object, so that there may be saturation of the ions with electrons.

One skilled in the art will appreciate that the method according to the present invention may be dynamically applied to the tubing (110) itself, and the principle can thus be applied in continuous flow as well as applied in batches on tanks or decanting sites.

The set of elements and devices required for the completion of the system is easily accessible and of easy knowledge to one skilled in the art, not requiring pieces, parts, components or any other apparatus of difficult access or sophisticated composition.

Noted also that various adaptations can be made without departing from the spirit and scope of the present invention. Thus, and only by way of example, the number of electrodes (130) may be varied according to the length of the used tubing (110).

In addition, several other devices may be included in order to control the flow of the oil/water emulsion (E) in the tubing, such as sensors, probes, and various volume and flow monitoring equipment.

Another advantage provided by the present invention is low electrical consumption, given the reduced electrical current demanded by the nature of the formation of the present electron trap. This aids the commercial viability of a system such as the one taught herein by applying the method of the present invention. The obvious consequence of this feature is also a more sustainable logic to the object of the present invention when implementing it. On the other hand, the electrical energy expenditure in a trivial electrolysis process is a major commercial impediment.

Therefore, it can be seen that the present solution allows for versatile, economical, fast and practical implementations.

It will be easily understood by one skilled in the art that modifications can be made to the present invention without departing from the concepts set out in the description above. Such modifications should be considered as included within the scope of the present invention. Consequently, the particular embodiments described in detail above are only illustrative and exemplary, and do not limit the scope of the present invention, which should be given the full extent of the appended claims and any and all equivalents thereof.

We claim:

1. A system for the separation of oil/water emulsions by electrocoalescence, the system comprising:
    a fluid conduction means or tubing, at least one cathode, at least one electrode, at least one anode, at least one power source and at least a spark gap for the cathode and a spark gap for the anode.

2. The system according to claim 1, wherein the tubing comprises at least an outer layer of dielectric material, an intermediate layer of electrically conductive material, and an inner layer of dielectric material.

3. The system according to claim 1, wherein the cathode comprises an inner layer of electrically conductive material and is coated with an outer layer of dielectric material.

4. The system according to claim 1, wherein the electrode comprises an inner layer of electrically conductive material and is coated with an outer layer of dielectric material.

5. The system according to claim 1, wherein the electrode is arranged inside the tubing, electrically insulated therefrom.

6. The system according to claim 1, wherein the anode comprises an inner layer of electrically conductive material and is coated with an outer layer of dielectric material and is in electrical contact with the tubing.

7. The system according to claim 1, wherein the cathode and the anode are respectively separated from the electrode and the tubing by means of spark gaps capable of acting as a device for transmitting electrical energy by means of sparking without electrical contact.

8. A system for the separation of oil/water emulsions by electrocoalescence, comprising a tubing arranged in the shape of a radiator or circuit in the form of a labyrinth, a cathode, a cathode electrode assembly an anode, an anode electrode assembly, a dynamic sieve, a power source and at least a spark gap for the cathode and a spark gap for the anode.

9. The system according to claim 8, wherein the system allows for the connection of the tubing of the system serially with one or more similar tubing.

10. A method for the separation of oil/water emulsions by electrocoalescence, comprising:
    providing a fluid conduction means or tubing, at least one cathode, at least one electrode, at least one anode, at least one power source and at least a spark gap for a cathode and a spark gap for the anode;
    introducing an oil/water emulsion (E) at one end of a tubing;
    activating a high voltage power source;
    emitting sparks in at least a cathode, an anode or both, by means of spark gaps (210);
    generating an electron trap inside the tubing by means of at least one energized electrode;
    ionizing the oil/water emulsion (E);
    separating oil (P) and water (A); and
    dispensing oil (P) and water (A) separated at one end of the tubing.

* * * * *